March 22, 1966     J. W. SCOTT     3,241,362
TAKE-OFF MONITORING SYSTEM FOR AIRCRAFT
Filed Sept. 14, 1961     2 Sheets-Sheet 1
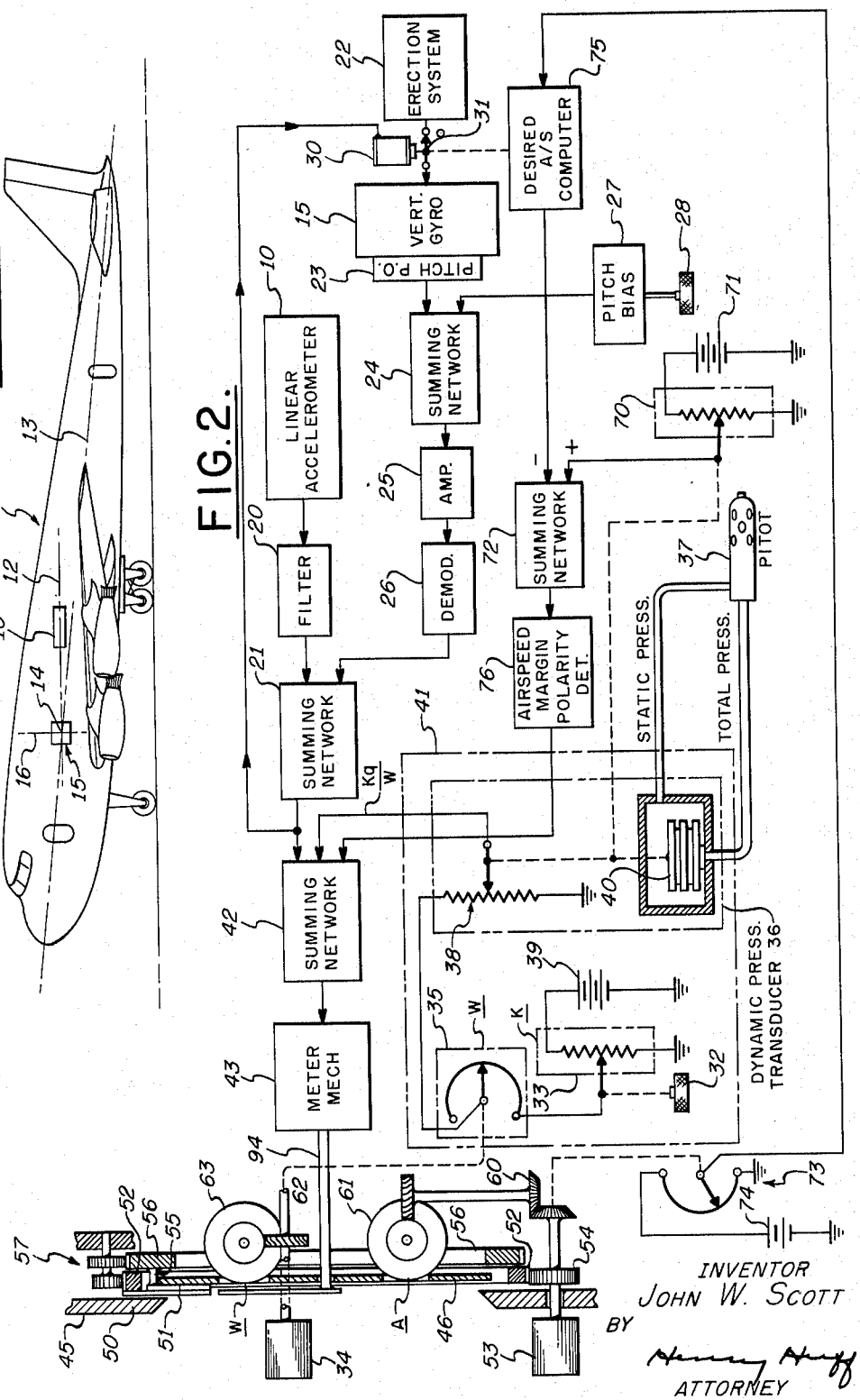
INVENTOR
JOHN W. SCOTT
BY
ATTORNEY March 22, 1966     J. W. SCOTT     3,241,362
TAKE-OFF MONITORING SYSTEM FOR AIRCRAFT
Filed Sept. 14, 1961     2 Sheets-Sheet 2

INVENTOR.
JOHN W. SCOTT
BY
ATTORNEY

United States Patent Office 3,241,362
Patented Mar. 22, 1966

3,241,362
TAKE-OFF MONITORING SYSTEM FOR AIRCRAFT
John W. Scott, Frankford, Del., assignor to Sperry Rand Corporation, Great Neck, N.Y., a corporation of Delaware
Filed Sept. 14, 1961, Ser. No. 138,140
4 Claims. (Cl. 73—178)

This invention relates to a system for monitoring the take-off performance of an aircraft. More particularly, it concerns a system for accurately providing a continuous comparison of the actual performance of the aircraft during take-off with the performance required for the aircraft to become safely airborne in which the system is compensated for undesirable air speed changes during take-off.

The system of the present invention is an improvement over the system described in the National Advisory Committee for Aeronautics Technical Note 3252, entitled, "Description and Preliminary Flight Investigation of an Instrument for Detecting Subnormal Acceleration During Take-off" by Garland J. Morris and Lindsay J. Lina dated November 1954. The system described utilizes an accelerometer mounted within the aircraft responsive to the longitudinal acceleration experienced by the craft. It is pointed out in the report that an indication of longitudinal acceleration alone is not suitable for providing an indication of malfunction because the longitudinal acceleration of an airplane normally decreases during the take-off run as a result of increasing aerodynamic drag and decreasing net thrust. With this condition, the pilot might be unable to distinguish between a deficiency in acceleration due to malfunction and a normal decrease in acceleration. To provide a constant indication of aircraft performance when performance is normal, the above system incorporates a dynamic pressure sensing element combined with the accelerometer to provide an indication of longitudinal acceleration compensated by dynamic pressure. Any deviation in acceleration during the take-off run is then detectable as a departure of the indication from the expected constant value.

The present invention improves the system described in the aforementioned report by compensating for the difference between the desired and actual air speeds by providing a correction signal representative of the amount which the desired air speed exceeds the actual air speed.

The system of the present invention is also an improvement over that described in U.S. patent application Serial No. 821,035 filed June 17, 1959, entitled Aircraft Take-off Performance Monitoring Apparatus in the name of T. Gold and issued February 12, 1963, as U.S. Patent No. 3,077,109. The present invention combines the acceleration-$q$ signal of the aforementioned patent application with a correction signal representative of the amount which the desired air speed exceeds the actual air speed in a manner that provides a simple, accurate indication of the aircraft performance to the pilot.

The present invention is an improvement over take-off monitoring devices which utilize an air speed indication per se since they can be misleading especially in the case where a larger head wind is encountered than has been predicted. In this event, the deterioration of the aircraft performance may be masked by the effects of the larger head wind.

It is a primary object of the present invention to provide a take-off monitor for aircraft that continuously and accurately monitors the performance of an aircraft in spite of deviation of the air speed from that predicted.

It is an additional object of the present invention to provide a take-off monitor for aircraft that provides a correction signal representative of the amount which the predicted air speed exceeds the actual air speed.

It is a further object of the present invention to provide a take-off monitor for aircraft that compensates for variations in wind.

These and other objects of the invention will become apparent from the following drawings in which:

FIG. 1 is a side view of an aircraft having components of the invention mounted therein;

FIG. 2 is a schematic block diagram of a preferred embodiment of a take-off monitoring system incorporating the present invention;

Figures 3, 4:
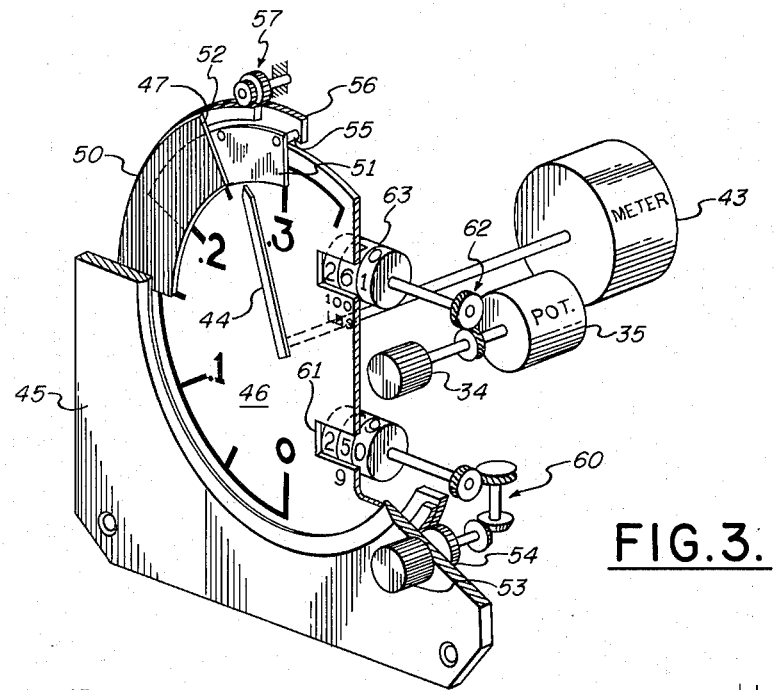
FIG. 3 is a perspective, partly in section, of the take-off monitor display for the system of FIG. 1.
FIG. 4 is a schematic wiring diagram of the predicted air speed computer of FIG. 2.

The presentation provided by the present invention is predicated in part upon the theory explained in the aforementioned patent application Serial No. 821,035. As explained in said application, a comparison of the desired and actual acceleration of the aircraft is provided based fundamentally upon the equation $$a_e = a_x + \frac{Kq}{W}$$

where $a_e$ = equivalent acceleration
$a_x$ = actual forward horizontal acceleration
$K$ = constant
$q$ = dynamic pressure
$W$ = gross weight The $a_e$ term is constant for any given take-off and can be determined as a function of engine performance, gross weight, atmospheric conditions and runway gradient. The $Kq/W$ term represents the expected decrease of acceleration as a function of changes in aerodynamic drag and engine thrust with increasing air speed. The aforementioned patent application teaches correcting the above for pitch attitude changes. The present invention concerns providing a correction representative of the amount which the desired air speed exceeds the actual air speed. While the present invention will be described for purposes of example in conjunction with the system disclosed in said patent application Serial No. 821,035, it will be appreciated that it is equally applicable to other types of aircraft performance monitoring apparatus.

Referring now to FIG. 1, a linear accelerometer 10 is shown mounted in an aircraft 11. The sensitive axis 12 of the accelerometer 10 is disposed parallel to the horizon with the aircraft 11 in its normal taxi position as shown in FIG. 1. In the taxi position, the longitudinal axis 13 of the aircraft is not necessarily parallel to the horizon and in fact it is usually at an angle thereto as indicated. In the position shown in FIG. 1, the accelerometer 10 is responsive to the forward acceleration of the aircraft only and provides a D.C. signal having a magnitude proportional thereto.

As the airplane 11 proceeds along the runway during the take-off run, it rotates around its pitch axis 14. The rotation of the aircraft 11 tilts the sensitive axis 12 of the accelerometer 10 causing the accelerometer 10 to sense an undesired component of gravity acceleration. The undesired component of gravity acceleration is compensated by means of a vertical gyro 15 in a manner to be explained with respect to FIG. 2.

As shown in FIG. 2, the linear accelerometer 10 is connected through a filter circuit 20 to a summing network 21. As explained above, the signal from the accelerometer 10 is substantially representative of the forward acceleration of the aircraft but may also include a component of the gravity acceleration. To provide a corrective pitch signal, the vertical gyro 15 is mounted in the aircraft, with its sensitive axis 16 normally maintained vertical, as shown in FIG. 1, by means of a gyro erection system 22. A pitch pick-off 23 connected to the vertical gyro 15 provides an A.C. signal representative of the pitch attitude of the aircraft. The amplitude and sense of the pitch signal is dependent upon the magnitude and direction of the longitudinal axis 13 of the aircraft 11 from the horizontal. The pitch pick-off 23 is connected to a summing network 24 which in turn is connected to an amplifier 25 and thence to a phase sensitive demodulator 26. The demodulator 26 is connected to provide a second D.C. input to the summing network 21.

A pitch bias circuit 27 is also connected to the summing network 24. The pitch bias circuit 27 is adjusted by means of a knob 28 to provide a bias signal to the summing network 24 in opposition to the signal provided by the pitch pick-off 23. The pitch bias signal corrects for the pitch attitude of the aircraft 11 in its taxi position to provide a zero signal output from the summing network 24 when the aircraft is standing on the runway at the beginning of the take-off run.

As the aircraft 11 proceeds down the runway during the take-off run and its pitch attitude changes, the vertical gyro 15 provides a signal representative of the change of pitch attitude to the summing network 21 to correct the acceleration signal for the gravity component sensed by the accelerometer 10. The output signal from the summing network 21 is a corrected acceleration signal $a_x$ which accurately represents the forward acceleration of the aircraft.

Under the influence of the forward acceleration experienced by the aircraft, the erection system 22 would normally erect the vertical gyro 15 to a false vertical thereby introducing errors in the pitch attitude signal. To prevent this, a relay 30 is connected to the output terminal of the summing network 21. The relay 30 is energized when the acceleration signal reaches a predetermined relatively low magnitude for example, 0.1 g. Energization of the relay 30 opens the normally closed switch or contact arm 31 connected between the erection system 22 and the vertical gyro 15 to disconnect the erection system 22. The vertical gyro 15 then operates in an unslaved condition with its vertical axis 16 substantially vertical except for gyroscopic drive effects. During the short period of the take-off run, the gyroscopic drift effects are negligible.

As the aircraft proceeds down the runway during the take-off run, its forward acceleration decreases in a normal manner due to increasing aerodynamic drag and decreasing engine thrust. For reasons explained previously, the acceleration signal is compensated by a signal representative of the $Kq/W$ term of the above-mentioned formula to provide a stable display during normal operation. As derived above, the K factor depends upon the aerodynamic characteristics of the particular aircraft which can be obtained by reference to manufacturers data. A signal representative of the K term is provided by manually adjusting a knob 32 to position the slider of a potentiometer 33. A D.C. voltage source 39 is applied across the resistive winding of the potentiometer 33. A signal representative of the gross weight W is obtained by manually adjusting a knob 34 which positions the slider of a potentiometer 35.

A signal representative of the dynamic pressure $q$ is obtained from a dynamic pressure transducer 36. The dynamic pressure transducer 36 is responsive to the actual static and total pressure as obtained from a Pitot tube 37. The transducer 36 positions the slider of a potentiometer 38 in accordance with dynamic pressure by means of a bellows 40.

The potentiometers 33, 35 and 38 are interconnected to form a D.C. computer network 41 which provides a signal representative of the $Kq/W$ factor. The output terminal of the computer network 41 is connected to an input terminal of a summing network 42. Another input terminal of the summing network 42 is connected to the output terminal of the summing network 21. The summing network 42 algebraically sums the corrected acceleration signal $a_x$ and the $Kq/W$ signal to provide an output signal representative of the actual aircraft performance which remains substantially constant during the take-off run under normal operation.

The output signal from the summing circuit 42 is connected to energize a D.C. meter movement 43. The meter movement 43 is mechanically connected to drive a pointer 44 in accordance with the output signal.

Referring now to FIGS. 2 and 3, the take-off monitor display is disposed within a housing 45 that is mounted preferably on the instrument panel of the aircraft. A fixed dial 46 is viewed through a circular opening in the housing 45. The dial 46 has graduations thereon representative of acceleration measures. Also viewable through the opening and extending around a portion of the periphery of the dial 46 is an adjustable cross-hatched mask 50. A second adjustable mask 51 also extends around a portion of the periphery of the dial 46. The mask 51 is slidable behind the mask 50 in a manner to be more fully described. The mask 51 preferably is painted a solid color or is otherwise painted to contrast with the color of the mask 50 to provide a line of demarcation 47 therebetween. The masks 50 and 51 as well as the line 47 are cooperative with the graduations on the dial 46.

The mask 50 is mounted on a ring gear 52 and movable therewith. The ring gear 52 is connected to be driven by manual rotation of an acceleration set knob 53 through a gear 54 which meshes with the gear 52. The mask 51 is connected by arms 55 to a ring gear 56 for rotation therewith. The ring gear 56 is connected to be driven by a ring gear 52 by means of a step-up gear drive 57. Rotation of the knob 53 thus rotates the ring gears 52 and 56 simultaneously but the mask 51 is driven at a faster rate than the mask 50. Thus, at any particular setting of the knob 53, the mask 51 protrudes beyond the mask 50 for an arcuate extent equivalent to a predetermined fixed percentage.

The knob 53 is connected by a gearing 60 to drive a counter 61 which is viewed through a rectangular opening in the dial 46. The knob 34 is connected by gearing 62 to drive a counter 63 which is viewed through another rectangular opening in the dial 46.

In accordance with the present invention, a correction signal is provided when the desired air speed during take-off exceeds the actual air speed. Referring now to FIG. 2, a positive signal representative of the actual indicated air speed is provided from the slider of a potentiometer 70 which has its resistive winding connected to a D.C. voltage source 71. The slider of the potentiometer 70 is connected to the bellows 40 to provide a positive signal in accordance with the position thereof to an input terminal of a summing network 72.

A desired acceleration potentiometer 73 has its resistive winding energized by a D.C. voltage source 74 and its slider is positioned by the rotation of the knob 53 to provide a signal representative of the desired acceleration to an input terminal of a desired air speed computer 75. The computer 75 essentially integrates the desired acceleration signal in a manner to be explained to provide a desired air speed signal having a negative polarity to an input terminal of the summing network 72. The summing network 72 is connected to an air speed margin polarity detector 76 which in turn is connected to an input terminal of the summing network 42. The air speed margin polarity detector 76 may comprise a diode poled to pass signals of negative polarity only.

The desired air speed computer 75 may include an electromechanical integrator of the type shown in FIG.

4 having an amplifier 80 connected to a servomotor 81 that in turn drives a tachometer generator 82. The tachometer generator 82 provides a rate feedback signal through one of two alternate connections in a manner to be explained. The servomotor 81 is also connected through reduction gearing 83 to simultaneously position the respective sliders of a desired air speed potentiometer 84 and an ecceleration-$q$ compensation potentiometer 85. The desired air speed potentiometer 84 is discontinuous in order that no signal is provided therefrom until a rotation equivalent to about eighty knots is attained to prevent erroneous indications due to the inherently poor accuracy of air speed transducers at low air speeds. The potentiometer 84 is energized to provide a signal of negative polarity by a D.C. power source 86.

Since the rate of change of air speed (acceleration) decreases as a function of air speed, the desired acceleration signal provided by the desired acceleration potentiometer 73 is reduced as a function of desired air speed by means of the acceleration-$q$ compensation potentiometer 85.

To start the integration of desired acceleration to obtain desired air speed at the beginning of the take-off run, the relay 30 further includes contact arms 90 and 91 which maintain the desired air speed computer 75 in a follow-up condition as shown in FIG. 4 until the aircraft acceleration reaches a predetermined amount for example 0.1$g$. The contact arms 90 and 91 are ganged to the contact arm 31. The contact arm 90 switches the tachometer generator feedback attenuation provided by the attenuators 92 and 93 to provide proper motor speeds in both the follow-up and computing modes of operation to be explained. The contact arm 91 alternatively connects the potentiometer 84 or the potentiometer 85 through a modulator 89 to the amplifier 80 for follow-up and computing modes of operation to be explained. The potentiometer 84 is also connected to the summing network 72 of FIG. 2.

The pointer 44 is connected to the meter movement 43 by a shaft 94 which protrudes through an aperture in the center of the dial 46. The pointer 44 rotates over the face of the dial 46 and is cooperative with the graduations thereon. The pointer 44 is also cooperative with masks 50 and 51 and the line of demarcation 47 therebetween. The line of demarcation 47 is indicative of the minimum acceptable performance required for a safe take-off as will be more fully explained with respect to the operation of the above-described system.

In the operation of the aforementioned system, the minimum acceptable take-off performance or desired acceleration measure is manually set by adjusting the knob 53 until the demarcation line 47 and the counter 61 indicate the desired value, for example, .250$g$ as shown in FIG. 3. Adjustment of the knob 53 provides an electrical signal representative of the desired acceleration from the potentiometer 73 to the computer 75. This value varies from take-off to take-off and may be determined in several ways which will be explained subsequently. The gross weight of the aircraft may also vary particularly for transport and bomber aircraft. The gross weight of the aircraft for the particular take-off is set by adjusting the knob 34 until the counter 63 reads accordingly. The potentiometer 35 is synchronized with the counter 63 in order that rotation of the knob 34 simultaneously provides an electrical signal representative of the gross weight of the aircraft to the computer network 41.

The knob 32 is adjusted to provide a signel representative of the aerodynamic characteristics of the aircraft K from the potentiometer 33 to the computer network 41. The pitch bias knob 28 is adjusted to provide a pitch bias signal which corrects for the pitch attitude of the aircraft at the beginning of the take-off run.

The relay 30 is in its unenergized condition with its contact arms 31, 90 and 91 in their upward position.

The erection system 22 is thus connected to the vertical gyro 15. The desired air speed computer 75 is in its follow-up mode with the potentiometer 84 connected to the amplifier 80 to drive the slider of the potentiometer 84 to its grounded position and thereby null the desired air speed signal.

As the aircraft proceeds along the runway at the beginning of the take-off run, the accelerometer 10 is responsive to the forward acceleration of the aircraft. The forward acceleration signal energizes the meter movement 43 which rotates the pointer 44 to provide an immediate indication of the actual performance of the aircraft. The pointer 44 may be visually compared with the demarcation line 47 to continuously monitor the performance of the aircraft. Normally, the pointer 44 will be driven in a clockwise direction to some position beyond the line 47 and the adjacent mask 51. If performance is marginal, the pointer 44 will be aligned with the line 47. If performance is submarginal, the pointer 44 will be to the left of the line 47 and adjacent the cross-hatched mask 50. As the aircraft continues to proceed down the runway, the accelerometer 10 continuously provides acceleration information which actuates the pointer 44 whereby the performance of the aircraft is continuously monitored. This allows the pilot to scan the take-off monitor display at his option.

When the aircraft acceleration reaches a predetermined magnitude, for example, 0.1$g$, the relay 30 is energized thereby placing its contact arms 31, 90 and 91 in their downward position which disconnects the erection system 22 and places the computer 75 in its computing mode of operation. In the computing mode, the motor 81 of the computer 75 is driven in accordance with the signal from the potentiometer 85 and positions the slider of the potentiometer 84 in accordance with the integral thereof, to provide a desired air speed signal having a magnitude proportional thereto and a negative polarity. The potentiometer 70 provides a positive polarity signal having a magnitude representative of the actual air speed. The desired and actual air speed signals are compared in the summing network 72.

If the composite signal from the network 72 has a positive polarity which is normally the case when the actual air speed exceeds the desired air speed, the composite signal is blocked by the detector 76. However, if the desired air speed exceeds the actual air speed, the composite signal from the network 72 will have a negative polarity and will be passed by the detector 76 to the summing network 42. The amount or margin which the desired air speed exceeds the actual air speed is applied to the meter mechanism 43 to return the actual acceleration-$q$ indication provided by the pointer 44. The relative level of the acceleration-$q$ signal and the negative margin signal may be, for example, a 0.04$g$ decrease in indication for a ten knot deficiency in air speed. At a typical acceleration level of 0.2$g$, this represents a twenty percent decrease in indication. In certain applications, it may be advisable to provide a non-linear output from the air speed margin polarity detector 76 in order that small negative margins have little effect while larger margins increase the correction signal exponentially.

As the aircraft continues down the runway, the air speed continues to increase while the actual forward acceleration decreases due to the effects of aerodynamic drag, engine thrust, and rolling friction, as explained previously. The increase in air speed causes an increase in dynamic pressure to be sensed by the dynamic pressure transducer 36. The transducer 36 positions the slider of its potentiometer 38 accordingly and by means of the computer network 41 a signal representative of $Kq/W$ is provided to the summing network 42. As explained above, the $Kq/W$ signal compensates for the decrease in acceleration in order that the pointer 44 is maintained in a substantially constant position providing the take-off is proceeding normally.

At some point during the take-off, the aircraft will begin to rotate about its pitch axis which will cause the linear accelerometer 10 to be responsive to a component of the gravity vertical. The unslaved vertical gyro 15 senses the change in pitch attitude and provides a signal representative thereof from its pitch pick-off 23 to the summing network 24. The output signal of the summing network 24 is representative of the pitch attitude change from the normal taxi attitude of the aircraft due to the pitch bias circuit 27. The pitch correction signal from the summing network 24 is amplified in the amplifier 25 and demodulated in the demodulator 26 to provide a D.C. input to the summing network 21 representative of the direction and magnitude of the pitch attitude change. This pitch correction signal opposes the signal of the gravity component sensed by the accelerometer 10. The output from summing network 21 is thus truly representative of the forward acceleration of the aircraft. The normal decrease in the forward acceleration signal is compensated in the summing network 42 by the $Kq/W$ signal to provide a substantially constant signal representative of the instantaneous performance of the aircraft to actuate the pointer 44.

During the entire take-off, the take-off monitor display of the present invention continuously presents to the pilot the actual instantaneous performance of the aircraft compared with the desired performance. When the point is reached on the runway which the pilot must decide whether to continue the take-off or to discontinue it, he has been constantly apprised of the relative performance of the aircraft. With the pointer 44 adjacent the cross-hatched mask 50, he should discontinue the take-off. With pointer 44 adjacent the line 47, performance is marginal but a take-off may be safely accomplished. With the pointer 44 adjacent the solid color mask 51, performance is normal and take-off is definitely indicated.

The minimum acceptable take-off preformance or desired acceleration may be determined in several ways. For single engine jet fighter aircraft, it may be representative of the acceleration which is normally provided by the static thrust of the aircraft when the air speed is zero. With a single engine plane, the only requirement may be to determine whether the acceleration is adequate, since engine failure eliminates any question regarding take-off. In multi-engine bomber or transport aircraft, on the other hand, the minimum acceptable take-off performance value may be dependent upon the acceleration available with one engine out since the aircraft may be able to take-off with the remaining engines operating normally. Another consideration is the distance required to stop the aircraft after a decision to discontinue the take-off has been reached.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a system for monitoring the performance of an aircraft during take-off, acceleration responsive means mounted in said aircraft for providing a signal representative of the forward acceleration experienced by said craft, means for providing a measure of the desired aircraft performance during take-off, means responsive to a function of said acceleration signal and said desired aircraft performance measure for providing a comparative indication therebetween whereby the aircraft performance is adapted to be monitored during take-off, means for providing a signal representative of the air speed desired during take-off, means responsive to the aircraft performance for providing a signal representative of the actual air speed of said craft, and means responsive to said desired and actual speed signals for correcting said comparative indication in accordance with the amount which the desired speed exceeds the actual speed.

2. In a system for monitoring the performance of an aircraft during take-off, acceleration responsive means mounted in said aircraft for providing a signal representative of the forward acceleration experienced by said craft, manually adjustable means for providing a measure of the desired aircraft performance during take-off, means responsive to said manually adjustable means for providing a signal representative of the air speed desired during take-off, means responsive to the aircraft performance for providing a signal representative of the actual air speed of said craft, means responsive to said desired and actual speed signal for providing a correction signal in accordance with the amount which the desired speed exceeds the actual speed, and indicating means responsive to a function of said acceleration signal, said desired aircraft performance measure and said correction signal for providing an indication whereby the aircraft performance is adapted to be monitored during take-off.

3. In a system for monitoring the performance of an aircraft during take-off, acceleration responsive means mounted in said aircraft for providing a signal substantially representative of the forward acceleration experienced by said craft, vertical reference means connected to said acceleration responsive means to correct said acceleration signal for changes in the pitch attitude of the craft during take-off, means for providing a measure of the desired aircraft performance during take-off, means for providing a signal representative of the air speed desired during take-off, means responsive to the aircraft performance for providing a signal representative of the actual air speed of said craft, means responsive to said desired and actual speed signals for providing a speed correction signal representative of the amount which the desired speed exceeds the actual speed, means responsive to said speed correction signal and to a function of said pitch-corrected acceleration signal for providing a composite corrected acceleration signal, and means responsive to said composite corrected acceleration signal and said desired aircraft performance measure for providing a comparative indication therebetween whereby the aircraft performance is adapted to be monitored during take-off.

4. In a system for monitoring the performance of an aircraft during take-off, acceleration responsive means mounted in said aircraft for providing a signal substantially representative of the forward acceleration experienced by said craft, vertical reference means associated with said acceleration responsive means to correct said acceleration signals for changes in the pitch attitude of the craft during take-off, erection means normally connected to said vertical reference means for maintaining said vertical reference means aligned with the vertical, switch means responsive to said pitch-corrected acceleration signal for disconnecting said erection means when said pitch corrected acceleration signal exceeds a predetermined amount, manually adjustable means for providing a measure of the desired aircraft acceleration during take-off, means responsive to said manually adjustable means for providing a signal having a negative polarity and a magnitude representative of the air speed desired during take-off, said switch means further including means for rendering said desired take-off speed signal ineffective below said predetermined acceleration, means responsive to the aircraft performance for providing a signal having a positive polarity and a magnitude representative of the actual air speed of said craft, means responsive to said desired and actual speed signals for providing a speed correction signal representative of the amount which the desired speed exceeds the actual speed, means responsive to said speed correction signal and to a function of said pitch-corrected acceleration signal for providing a composite corrected acceleration signal, and means responsive to said composite corrected acceleration signal and said desired aircraft performance measure for providing a visual comparison therebetween whereby the aircraft performance is adapted to the monitored during take-off.

References Cited by the Examiner

UNITED STATES PATENTS

| | | | |
|---|---|---|---|
| 2,182,706 | 12/1939 | Shanley | 73—178 X |
| 2,845,623 | 7/1958 | Iddings. | |
| 2,922,982 | 1/1960 | Hoekstra. | |
| 2,948,496 | 8/1960 | Joline | 244—77 |
| 3,058,699 | 10/1962 | Osder. | |

FOREIGN PATENTS 1,264,133   5/1961   France.

LOUIS R. PRINCE, *Primary Examiner.*